(12) United States Patent
Tsai et al.

(10) Patent No.: US 11,356,699 B2
(45) Date of Patent: Jun. 7, 2022

(54) METHOD AND APPARATUS OF SUB-BLOCK DEBLOCKING IN VIDEO CODING

(71) Applicant: MEDIATEK INC., Hsinchu (TW)

(72) Inventors: Chia-Ming Tsai, Hsinchu (TW);
Chih-Wei Hsu, Hsinchu (TW);
Tzu-Der Chuang, Hsinchu (TW);
Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 16/738,288

(22) Filed: Jan. 9, 2020

(65) Prior Publication Data
US 2020/0228832 A1      Jul. 16, 2020

Related U.S. Application Data

(60) Provisional application No. 62/791,545, filed on Jan. 11, 2019.

(51) Int. Cl.
*H04N 19/593* (2014.01)

(52) U.S. Cl.
CPC .................. *H04N 19/593* (2014.11)

(58) Field of Classification Search
CPC ....................................................... H04N 19/593
See application file for complete search history.

(56) References Cited

U.S. PATENT DOCUMENTS

| | | | | |
|---|---|---|---|---|
| 2011/0200100 A1* | 8/2011 | Kim | ...................... | H04N 19/14 375/240.02 |
| 2013/0182764 A1* | 7/2013 | Narroschke | ............ | H04N 19/82 375/240.12 |

(Continued)

FOREIGN PATENT DOCUMENTS

TW          201739252 A      11/2017

OTHER PUBLICATIONS

Jeon et al. (English Translation of WO 2020005031 A1) (Year: 2018).*

(Continued)

*Primary Examiner* — Edemio Navas, Jr.
*Assistant Examiner* — Jill D Sechser
(74) *Attorney, Agent, or Firm* — Oblon, McClelland, Maier & Neustadt, L.L.P.

(57) ABSTRACT

Method and apparatus for constrained de-blocking filter are disclosed. According to one method, a current block is partitioned into a plurality of sub-blocks using SDIP (Short Distance Intra Prediction mod). A first Bs (boundary strength) for an internal block boundary of the plurality of sub-blocks is determined by setting the first Bs to a second Bs of an Intra-coded boundary block of the current block. De-blocking process is applied, using the first Bs, to reconstructed samples across the internal block boundary of the plurality of sub-blocks to generate filtered-reconstructed samples. In another method, the current block is partitioned into two sub-blocks using SBT (sub-block transform) horizontally or vertically and the first Bs (boundary strength) is determined for an internal block boundary between the two sub-blocks by setting the first Bs to a second Bs of a non-zero cbf (coded block flag) block of the two sub-blocks in step.

10 Claims, 10 Drawing Sheets

(56) References Cited

U.S. PATENT DOCUMENTS

| | | | |
|---|---|---|---|
| 2014/0369428 A1* | 12/2014 | Park | H04N 19/117 375/240.29 |
| 2016/0057449 A1* | 2/2016 | Oh | H04N 19/182 375/240.12 |
| 2017/0094274 A1* | 3/2017 | Chien | H04N 19/122 |
| 2017/0127090 A1* | 5/2017 | Rosewarne | H04N 19/14 375/240.02 |
| 2018/0255295 A1* | 9/2018 | Lee | H04N 19/176 |
| 2019/0068989 A1* | 2/2019 | Lee | H04N 19/122 |

OTHER PUBLICATIONS

English Translation of KR20200073124A (Year: 2018).*
Office Action dated Mar. 30, 2021 in Taiwanese Patent Application No. 109100898, with concise English translation.

* cited by examiner

METHOD AND APPARATUS OF SUB-BLOCK DEBLOCKING IN VIDEO CODING

CROSS REFERENCE TO RELATED APPLICATIONS

The present invention claims priority to U.S. Patent Application, Ser. No. 62/791,545, filed on Jan. 11, 2019. The U.S. Patent Application is hereby incorporated by reference in its entirety.

FIELD OF THE INVENTION

The present invention relates to coding of video and image data. In particular, the present invention relates to techniques to improve video quality by using de-blocking filtering in video/image coding systems utilizing sub-block prediction including SDIP (Short Distance Intra Prediction mod) or SBT (sub-block transform).

DESCRIPTION OF THE RELATED ART

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video compression formats such as H.264/AVC and the emerging HEVC (High Efficiency Video Coding) standard.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Furthermore, the basic unit for transform coding is square size named Transform Unit (TU).

In HEVC, de-blocking filter is applied after the picture is reconstructed. The boundaries between coding units, prediction units or transform units are filtered to alleviate the blocking artefacts caused by the block-based coding. The boundary can be a vertical or horizontal boundary. The boundary pixels involved in de-blocking filter for the vertical boundary (110) and horizontal boundary (120) as shown in FIG. 1A and FIG. 1B respectively. For a vertical boundary (i.e., line 110 in FIG. 1A), a horizontal filter is applied to some boundary samples in each horizontal line. For example, the horizontal de-blocking filter may be applied to p00, p01 and p02 on the left side of the vertical boundary and q00, q01 and q02 on the right side of the vertical boundary. Similarly, for a horizontal boundary (i.e., line 120 in FIG. 1B), a horizontal filter is applied to some boundary samples in each vertical line. For example, the vertical de-blocking filter may be applied to p00, p01 and p02 on the left side of the horizontal boundary and q00, q01 and q02 on the right side of the horizontal boundary. In other words, the de-blocking filter is applied in a direction perpendicular to the boundary. As shown in FIG. 1A and FIG. 1B, when doing vertical de-blocking filtering (i.e., filtering horizontal boundaries), the above block height (from TU or PU) of a horizontal boundary is referred as the side length of the P side and the below block height (from TU or PU) of the horizontal boundary is referred as the side length of the Q side. Similarly, when doing horizontal de-blocking filtering (i.e., filtering vertical boundaries), the left block width (from TU or PU) of a vertical boundary is referred as the side length of the P side and the right block width (from TU or PU) of the vertical boundary is referred as the side length of the Q side.

A boundary strength (Bs) value is calculated for each four-sample length boundary and can take 3 possible values as defined in Table 1. Luma and chroma components are processed separately in the de-blocking process. For the Luma component, only block boundaries with Bs values equal to 1 or 2 can be filtered. In the case of chroma components, only boundaries with Bs value equal to 2 can be filtered.

For luma component, additional conditions are checked for each four-sample length boundary to determine whether de-blocking filtering should be applied and to further determine whether a normal filter or a strong filter should be applied if de-blocking is applied.

For the luma component in the normal filtering mode, two samples at each side of the boundary can be modified. In the strong filtering mode, three samples at each side of the boundary can be modified.

For the chroma component, only one sample at each side of the boundary can be modified when the boundary strength is greater than 1.

TABLE 1

| Conditions | Bs |
|---|---|
| At least one of the blocks is Intra | 2 |
| At least one of the blocks has non-zero coded residual coefficient and boundary is a transform boundary | 1 |
| Absolute differences between corresponding spatial motion vector components of the two blocks are >= 1 in units of inter pixels | 1 |
| Motion-compensated prediction for the two blocks refers to different reference pictures or the number of motion vectors is different for the two blocks | 1 |
| Otherwise | 0 |

Recently, some more flexible block structures are introduced in Joint Video Exploration Team (JVET). For example, the Quad-Tree plus Binary-Tree (QTBT) structure has been proposed in JVET-O0024 (H. Huang, et al., "*EE2.1: Quadtree plus binary tree structure integration with JEM tools*", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-O0024). Asymmetric Tree (AT) block partition has been disclosed in D0064 (F. Le Leannec, et al., "*Asymmetric Coding Units in QTBT*", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0064). Also, Multi-Type-Tree (MTT) structure has been disclosed in D0117 (X. Li, et al.,"*Multi-Type-Tree*", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0117). In QTBT, recursive binary-tree CU partition can be applied at the leaf node of quad-tree. In MTT, additional triple-tree (TT) can be chosen for CU partition. FIG. 2 illustrates examples of different block partition types. In FIG. 2, quad-tree partitioning 210, vertical binary-tree partitioning 220, horizontal binary-tree partitioning 230, vertical centre-side triple-tree partitioning 240, horizontal centre-side triple-tree partitioning 250, vertical-left asymmetric tree partition 260, vertical-right asymmetric tree partition 270, horizontal-top asymmetric tree partition 280, and horizontal-bottom asymmetric tree partition 290 are shown.

Advanced Temporal Motion Vector Prediction (ATMVP)

In Joint Exploration Model (JEM) software with QTBT, each CU can have at most one set of motion for each prediction direction. The Advanced Temporal Motion Vector Prediction (ATMVP) mode is firstly proposed in VCEG-AZ10 (W.-J. Chien, et al., "*Extension of Advanced Temporal Motion Vector Predictor*", ITU-T SG16/Q6 Document: VCEG-AZ10, June 2015). In ATMVP, a large CU is split into sub-CUs and motion information is derived for all the sub-CUs of the large CU. The ATMVP mode uses a spatial neighbour to get an initial vector, and the initial vector is used to determine the coordinate of the collocated block on the collocated picture. The sub-CU (usually 4×4 or 8×8) motion information of the collocated block in the collocated picture is then retrieved and filled into sub-CU (usually 4×4 or 8×8) motion buffer of current Merge candidate. For example, FIG. 3 illustrates an example of ATMVP derivation, where a target block 312 in the current picture is divided into four sub-blocks. A collocated block 322 in a collocated picture is identified. The collocated block is also divided into four sub-blocks. The motion information of each sub-block is retrieved. For example, the upper-left sub-block is uni-prediction with a motion vector pointing to list 0 (i.e., MV0 as indicated by a solid-line arrow), the lower-right sub-block is uni-prediction with a motion vector pointing to list 1 (i.e., MV1 as indicated by a dash-line arrow), and the remaining sub-blocks are bi-prediction. The initial vector of the ATMVP mode may be modified in some embodiments. Some variant embodiments of the ATMVP are proposed. For example, a simplified ATMVP mode is disclosed in JVET-K0346 (X. Xiu, et al., "*CE4-related: One simplified design of advanced temporal motion vector prediction (ATMVP)*", Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0346). In JVET-L0198 (S. H. Wang, ey al., "*CE4-related: Simplification of ATMVP candidate derivation*", Joint Video Exploration Team (JVET) of ITU-T SG 16 WP 3 and ISO/IEC JTC 1/SC 29/WG 11, 12th Meeting: Macao, China, October 2018, Document: JVET-L0198), another simplified ATMVP is disclosed.

Affine Inter Prediction

Motion occurs across pictures along temporal axis can be described by a number of different models. Assuming A(x, y) be the original pixel at location (x, y) under consideration, A' (x', y') be the corresponding pixel at location (x', y') in a reference picture for a current pixel A(x, y), the affine motion models are described as follows.

The affine model is capable of describing two-dimensional block rotations as well as two-dimensional deformations to transform a square (or rectangles) into a parallelogram. This model can be described as follows:

$$x' = a_0 + a_1 * x + a_2 * y, \text{ and}$$

$$y' = b_0 + b_1 * x + b_2 * y. \quad (1)$$

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \overset{\Delta}{\Longrightarrow} \begin{cases} vx = (1-a)x - by - e \\ vy = (1-a)y + bx - f \end{cases} \quad (2)$$

An example of the four-parameter affine model is shown in FIG. 4A. The transformed block is a rectangular block. The motion vector field of each point in this moving block can be described by the following equation:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \quad (3)$$

In the above equations, $(v_{0x}, v_{0y})$ is the control point motion vector (i.e., $v_0$) at the upper-left corner of the block, and $(v_{1x}, v_{1y})$ is another control point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used. In order to further simplify the motion compensation prediction, block based affine transform prediction is applied. To derive motion vector of each 4×4 sub-block, the motion vector of the centre sample of each sub-block. An example of motion vectors for a current block can be determined for each 4×4 sub-block based on the MVs of the two control points as shown in FIG. 4B according to equation (3) and rounded to 1/16 fraction accuracy. Then the motion compensation interpolation filters are applied to generate the prediction of each sub-block with derived motion vector. After MCP, the high accuracy motion vector of each sub-block is rounded and saved as the same accuracy as the normal motion vector.

Short Distance Intra Prediction Mode

The short distance Intra prediction mode (SDIP, or also called as Subpartition Prediction (ISP) mode) is an updated version of the Line-Based Intra (LIP) coding that corrects the hardware-related issues of the previous design of the algorithm. The SDIP tool divides luma intra-predicted blocks vertically or horizontally into 2 or 4 sub-partitions depending on the block size dimensions, as shown in Table 2. FIG. 5A and FIG. 5B show examples of the two possibilities. In FIG. 5A, an H×W block 510 is partitioned into two H/2×W blocks 520 (i.e., horizontal partition) or two H×W/2 blocks 530 (i.e., vertical partition). For example, the block can be a 4×8 block or an 8×4 block. In FIG. 5B, an H×W block 510 is partitioned into four H/4×W blocks 540 (i.e., horizontal partition) or four H×W/4 blocks 550 (i.e., vertical partition) except for 4×8, 8×4 and 4×4 blocks. All sub-partitions fulfil the condition of having at least 16 samples.

TABLE 2

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

For each of these sub-partitions, a residual signal is generated by entropy decoding the coefficients sent by the encoder and then inverse quantizing and inverse transforming them. Then, the sub-partition is Intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same Intra mode Based on the Intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

Bilateral Template MV Refinement or Decoder-Side MV Refinement (DMVR)

Bilateral Template MV Refinement (BTMVR) is also referred as Decoder-side MV refinement (DMVR) in some literature. For example, in JVET-D0029 (Xu Chen, et al., "Decoder-Side Motion Vector Refinement Based on Bilateral Template Matching", Joint Video Exploration Team (WET) of ITU-T SG 16 WP 3 and ISO/IEC JTC 1/SC 29/WG 11, 4th Meeting: Chengdu, CN, 15-21 Oct. 2016, Document: WET-D0029), Decoder-Side Motion Vector Refinement (DMVR) based on bilateral template matching is disclosed. The process of BTMVR is shown in FIG. 6, where block 610 is a current block. Initial motion vectors MV0 620*a* and MV1 620*b* for current block 610 are determined. For example, the initial motion vectors may be derived from the Merge candidate. The BTMVR process is applied to a bi-predicted block. In other words, MV0 points to an L0 reference picture 670*a* and MV1 points to an L1 reference picture 670*b*. An L0 reference block 630*a* in L0 reference picture 670*a* can be located from the corresponding location 610*a* of the current block in L0 reference picture 670*a* and MV0 620*a*. Similarly, an L1 reference block 630*b* in L1 reference picture 670*b* can be located from the corresponding location 610*b* of the current block in L1 reference picture 670*b* and MV1 620*b*. A template 640 is generated by using the bi-prediction from the two reference blocks (530*a* and 630*b*) pointed by MV0 620*a* and MV1 620*b* respectively, as shown in FIG. 6. In one embodiment, the bilateral template 640 is calculated as the average of L0 block 630*a* and L1 block 630*b*, but not limited to this embodiment. In the next step, it uses the bilateral template to do integer ME (Motion Estimation) and fractional ME searching around L0 Reference Block in L0 Reference Picture with a search range of P pixel×Q pixel, and finds the location of minimum ME cost. The ME cost has many embodiments, one embodiment is the SAD (Sum of Absolute Difference), but not limited to this embodiment. The final location of minimum ME cost is assigned to a refined MV of L0. Similar step is applied to located a refines MV of L1. For example, using the template as a new current block and perform the motion estimation to find a better matching block (i.e., refined reference block 650*a* and refined reference block 650*b*) in L0 reference picture 660*a* and L1 reference picture 660*b*, respectively, as shown in FIG. 6. The refined MVs are referred as the MV0' 660*a* and MV1' 660*b*, as shown in FIG. 6. Then the refined MVs (MV0' and MV1') are used to generate a final bi-predicted prediction block for the current block.

Sub-Block Transform (SBT)

For an Inter-predicted CU with cu_cbf (coded block flag) equal to 1, cu_sbt_flag may be signalled to indicate whether the whole residual block or a sub-part of the residual block is decoded. In the former case, Inter MTS (Multiple Transform Set) information is further parsed to determine the transform type of the CU. In the latter case, a part of the residual block is coded with inferred adaptive transform and the other part of the residual block is zeroed out.

Position-dependent transform is applied on luma transform blocks in SBT-V and SBT-H (chroma TB always using DCT-2). The two positions (i.e., left-right or top-bottom positions) of SBT-H and SBT-V are associated with different core transforms. More specifically, the horizontal and vertical transforms for each SBT position is specified in FIG. 7 for four different partitions (710, 720, 730 and 740). For example, the horizontal and vertical transforms for SBT-V position A is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered as a syntax shortcut for the cases that the major residual of a block is at one side of the block.

BRIEF SUMMARY OF THE INVENTION

A method and apparatus for de-blocking of reconstructed picture in for video encoding or video decoding are determined. According to this method, input data related to a current block in a current picture are received at a video encoder side or a video bitstream corresponding to compressed data including the current block in the current picture is received at a video decoder side, where the current block is partitioned into a plurality of sub-blocks using SDIP (Short Distance Intra Prediction mod). A first Bs (boundary strength) for an internal block boundary of the plurality of sub-blocks is determined by setting the first Bs to be the same Bs of target boundary of the current block or by setting the first Bs to a selected strength value, wherein a target block having the target boundary of the current block is an Intra-coded block. De-blocking process is applied, using the first Bs, to reconstructed samples across the internal block boundary of the plurality of sub-blocks to generate filtered-reconstructed samples. A filtered decoded picture including the filtered-reconstructed samples is provided.

In one embodiment, the internal block boundary of the plurality of sub-blocks is aligned with an N×N de-blocking grids, where N is a positive integer. For example, the N is equal to 8 or 4. In one embodiment, the current block is partitioned into two or four sub-blocks in a horizontal or vertical direction using the SDIP if each partitioned sub-block has at least 16 samples. In one embodiment, a current sub-block of the plurality of sub-blocks is used to predict a next sub-block of the plurality of sub-blocks. In one embodiment, the selected strength value corresponds to 1 or 2.

According to another method, the current block is partitioned into two sub-blocks using SBT (sub-block transform) horizontally or vertically. A first Bs (boundary strength) for an internal block boundary between the two sub-blocks is determined by setting the first Bs to a selected strength value if any of the two sub-blocks has a non-zero cbf (coding block flag), where the non-zero cbf indicates at least one significant coefficient in an corresponding block. The de-blocking process is applied, using the first Bs, to reconstructed samples across the internal block boundary to generate filtered-reconstructed samples. A filtered decoded picture including the filtered-reconstructed samples is provided.

In one embodiment, the internal block boundary of the plurality of sub-blocks is aligned with an N×N de-blocking grids, where N is a positive integer. For example, the N is equal to 8 or 4. In one embodiment, position-dependent transform is applied to the non-zero cbf block of the two sub-blocks. In one embodiment, the selected strength value corresponds to 1.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the following, various methods for de-block processing of sub-block boundaries are disclosed as follows.

Method 1:

When an Intra, Inter, or transform coding mode (e.g., ATMVP, Affine, Planar MVP mode, SDIP, DMVR, SBT) splits a CU into multiple sub-blocks, de-blocking can be applied to internal partition boundaries, which are aligned with sub-block boundaries according to this method. Let N be the minimum size (either width or height) of luma coding block, de-blocking is applied to boundary at N×N luma grid. For example, in QTBT, N is equal to 4.

Figure 1A:
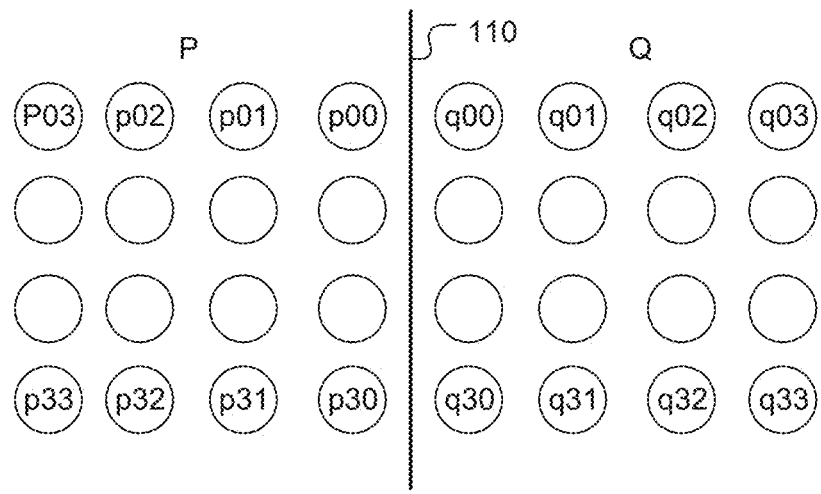
FIG. 1A illustrates an example of vertical boundary and involved samples of two blocks (P and Q) on two sides of the vertical boundary for de-blocking filtering.
Figure 1B:
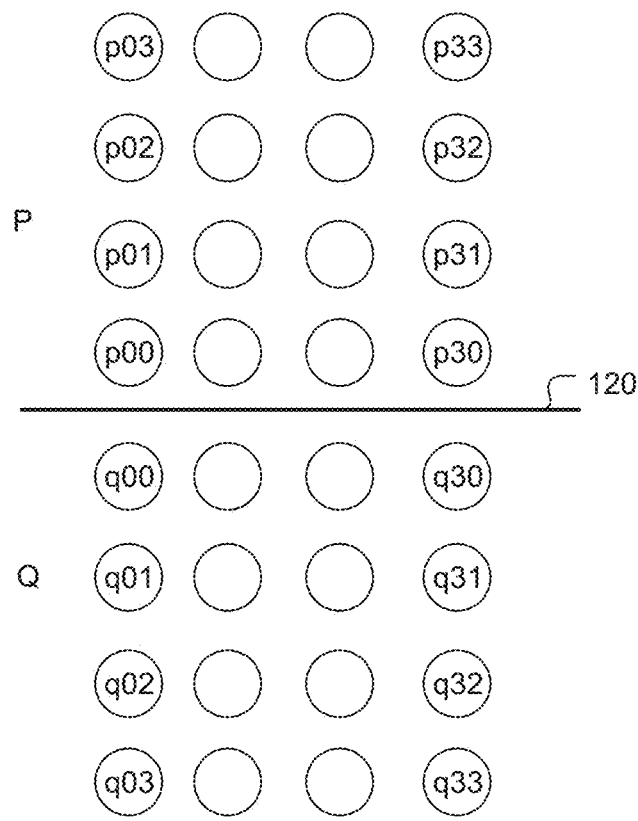
FIG. 1B illustrates an example of horizontal boundary and involved samples of two blocks (P and Q) on two sides of the horizontal boundary for de-blocking filtering.
Figure 2:
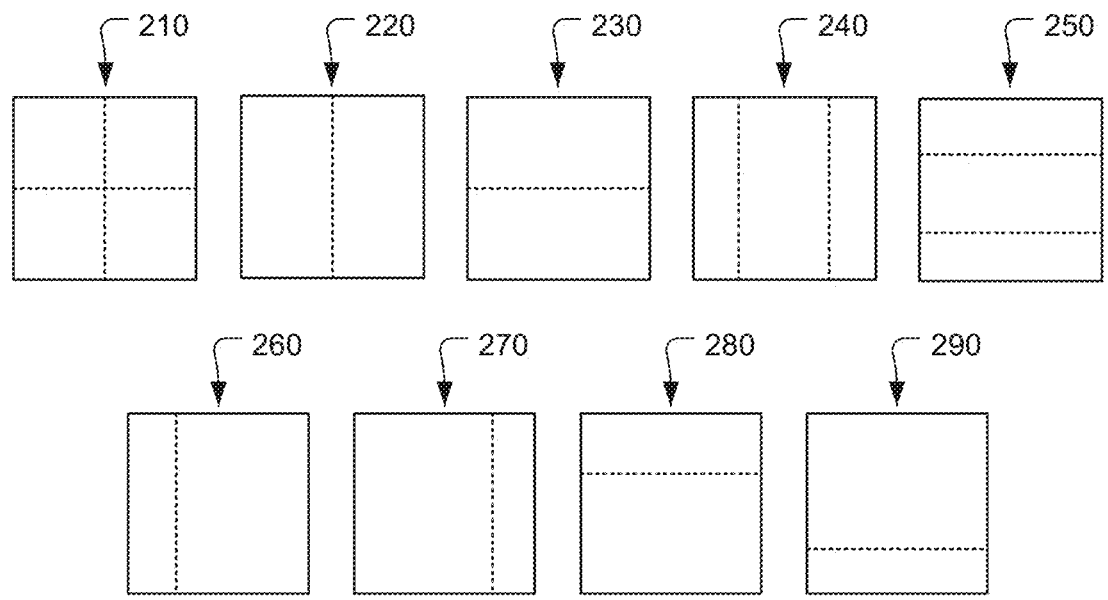
FIG. 2 illustrates examples of various block partition including (first row from left to right) quad-tree partitioning, vertical binary-tree partitioning, horizontal binary-tree partitioning, vertical centre-side triple-tree partitioning, horizontal centre-side triple-tree partitioning, and (second row from left to right) vertical-left asymmetric tree partition, vertical-right asymmetric tree partition, horizontal-top asymmetric tree partition, and horizontal-bottom asymmetric tree partition.
Figure 3:
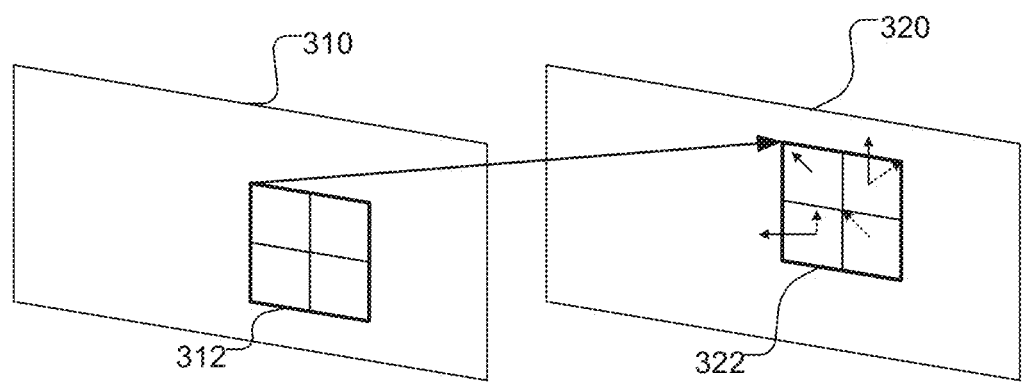
FIG. 3 illustrates an example of ATMVP, where a CU is partitioned into sub-PUs.
Figure 4A:
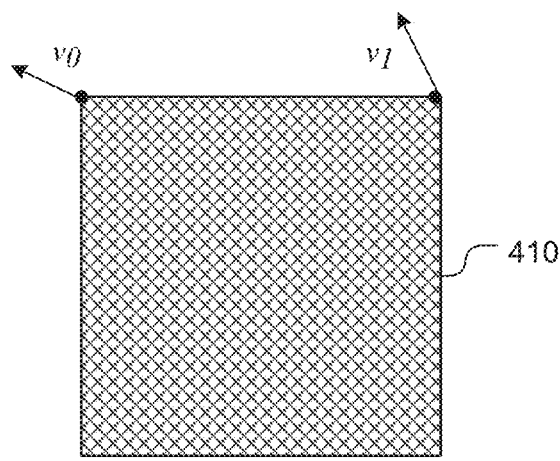
FIG. 4A illustrates an example of the four-parameter affine model, where the transformed block is a rectangular block.
Figure 4B:
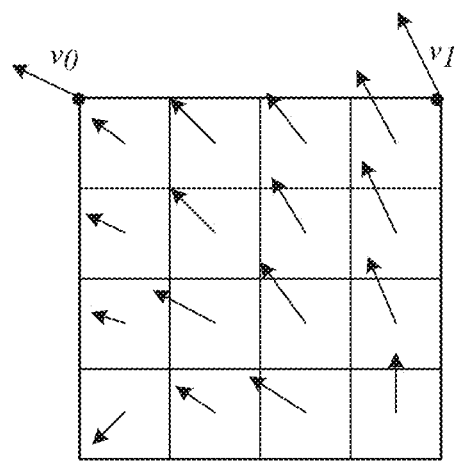
FIG. 4B illustrates an example of motion vectors for a current block, where the motion vector for each 4×4 sub-block is derived based on the MVs of the two control points.
Figure 5A:
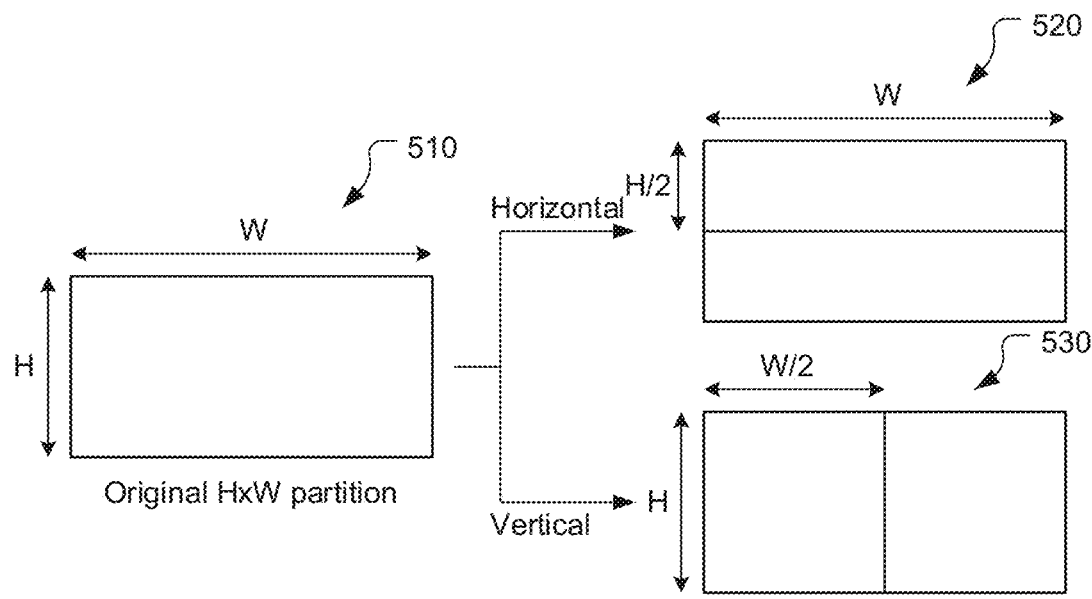
FIG. 5A show an example of the short distance Intra prediction mode (SDIP) by partitioning a block into two sub-blocks horizontally or vertically.
Figure 5B:
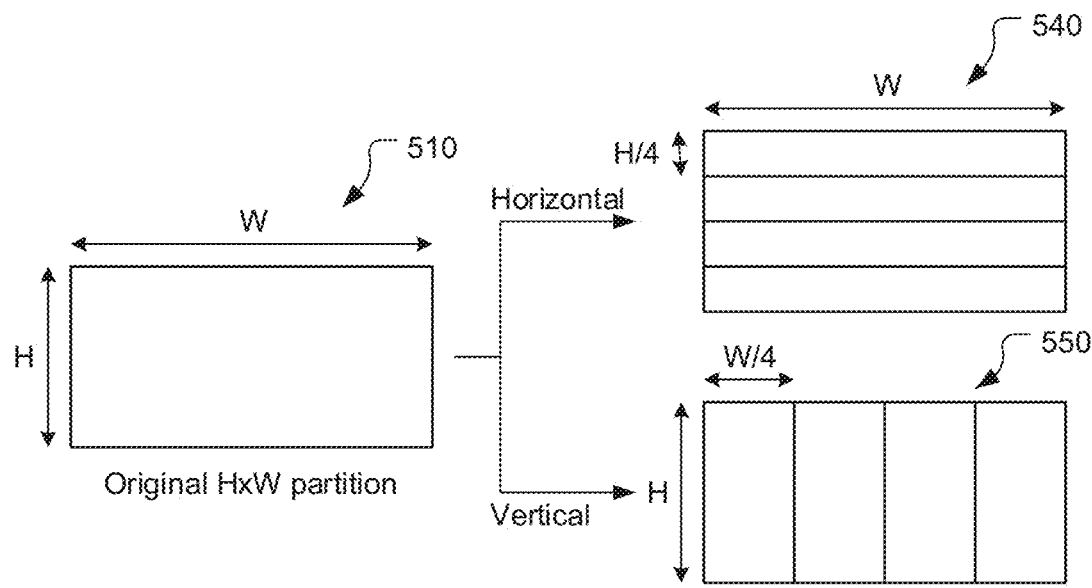
FIG. 5B show an example of the short distance Intra prediction mode (SDIP) by partitioning a block into four sub-blocks horizontally or vertically.
Figure 6:
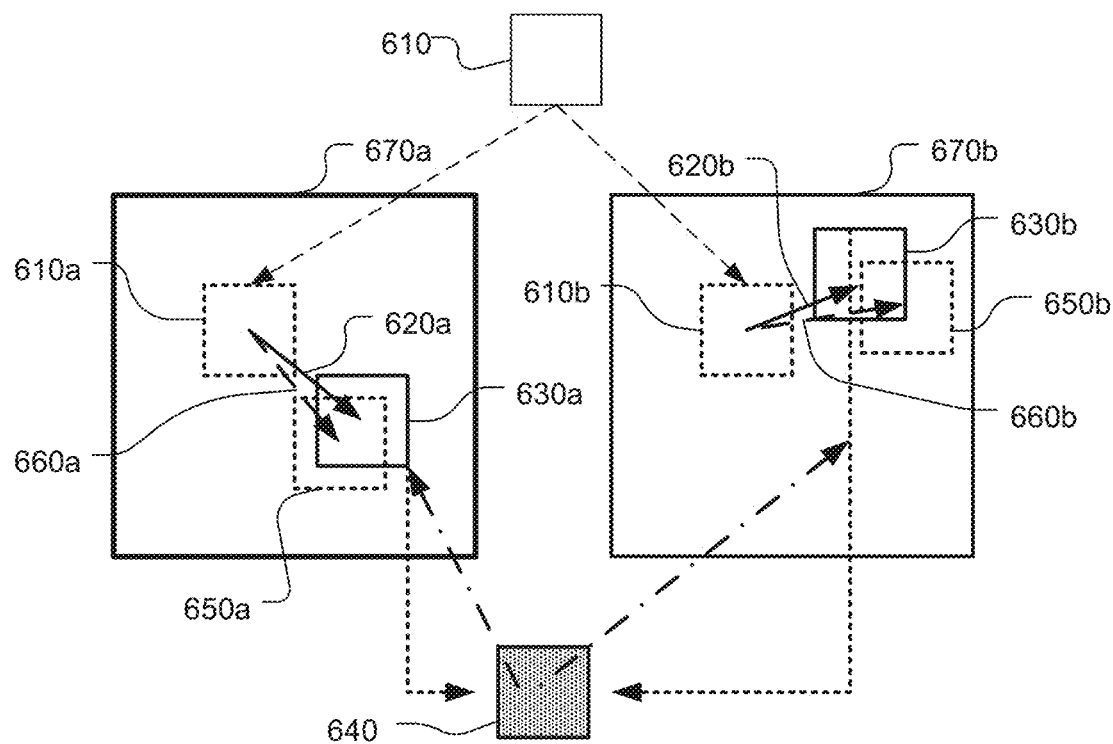
FIG. 6 illustrates an example of Decoder-side MV refinement (DMVR).
Figure 7:
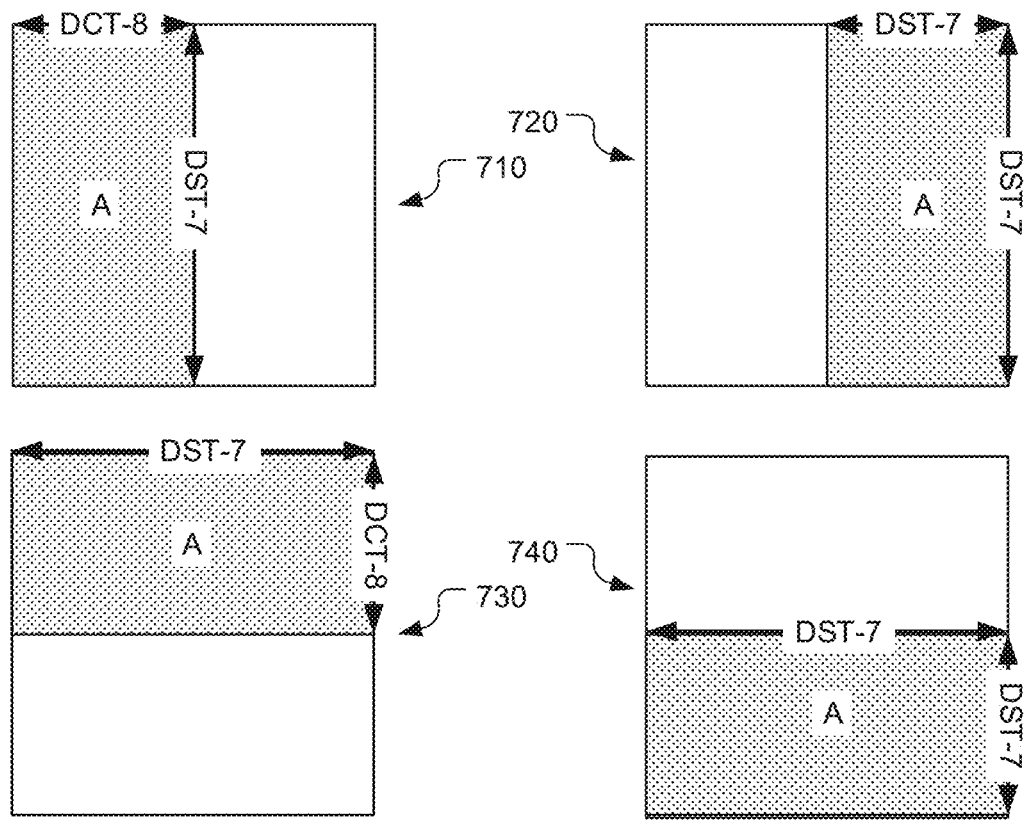
FIG. 7 illustrates an example of Sub-block transform (SBT), where a block is partitioned into two sub-blocks horizontally or vertically.
Figure 8A:
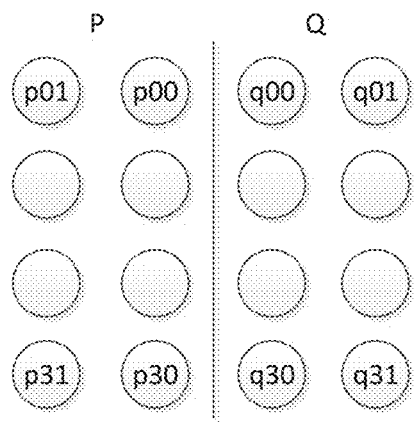
FIG. 8A illustrates an example of the number of boundary samples involved in de-blocking each vertical boundary to be N (N=4) according to an embodiment of the present invention.
Figure 8B:
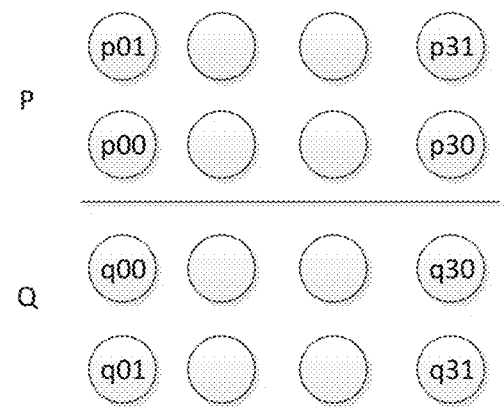
FIG. 8B illustrates an example of the number of boundary samples involved in de-blocking each horizontal boundary to be N (N=4) according to an embodiment of the present invention.

In one embodiment, the number of boundary samples involved in de-blocking each vertical boundary is N and the number of samples at each side of the boundary is N/2. An example of involved samples for N=4 is illustrated in FIG. 8A. The number of boundary samples involved in de-blocking each horizontal boundary is N and the number of N/2 samples at each side of the boundary is N/2. An example of the involved samples for N=4 is illustrated in FIG. 8B.

In another embodiment, the samples filtered by normal filtering mode are the closest N/4 samples at each side of the boundary and the samples filtered by strong filtering mode are the closest N/2 samples at each side of the boundary. If N is equal to 4, then the filtered samples by normal filtering mode are pi0, qi0 as shown in FIG. 8A and FIG. 8B, the samples filtered by strong filtering mode are pi0, pi1, qi0, qi1 as shown in FIG. 8A and FIG. 8B.

In still another embodiment, the samples filtered by normal filtering mode are the closest N/2 samples and the strong filtering mode is disabled. If N is equal to 4, then the samples filtered by normal filtering mode are pi0, pi1, qi0, qi1 as shown in FIG. 8A and FIG. 8B. In other words, there's only one filtering mode instead of two.

In still another embodiment, the samples filtered by normal filtering mode are the closest N/4 samples and the strong filtering mode is disabled. If N is equal to 4, then the samples filtered by normal filtering mode are pi0, qi0 as shown in FIG. 8A and FIG. 8B. In other words, there is only one filtering mode instead of two.

In still another embodiment, strong filtering mode is conditionally disabled. If the width of current sub-block is equal to N, then strong filtering mode is disabled for vertical boundary. If the height of current sub-block is equal to N, then strong filtering mode is disabled for horizontal boundary.

The normal and strong filtering indicate the smoothness of filter. In one example of N=4, the impulse response of normal filtering is (3 7 9-3)/16, the impulse response of strong filtering is (1 2 2 1)/4.

In still another embodiment, when the sub-block width or height is N (e.g. N=4) and is smaller than the de-blocking grid (i.e., 8), the normal and strong filters are conditionally applied to one boundary and are skipped for the other boundary. In one example, the filters are applied to the first boundary in FIG. 9A and FIG. 9B. In another example, the filters are applied to the second boundary in FIG. 9A and FIG. 9B. All the operations for normal and strong filter can be kept the same.

Method 2:

When an Intra, Inter or transform coding mode (e.g., ATMVP, Affine, Planar MVP mode, SDIP, DMVR, SBT) splits a CU into many sub-blocks, de-blocking then can be applied to internal partition boundaries, which are aligned with sub-block boundaries. Let the minimum size for de-blocking is M. De-blocking process on a boundary depends on the current sub-block size. If sub-block size (either width or height) is larger than or equal to M, the same de-blocking process as in HEVC is applied.

Figure 9A:
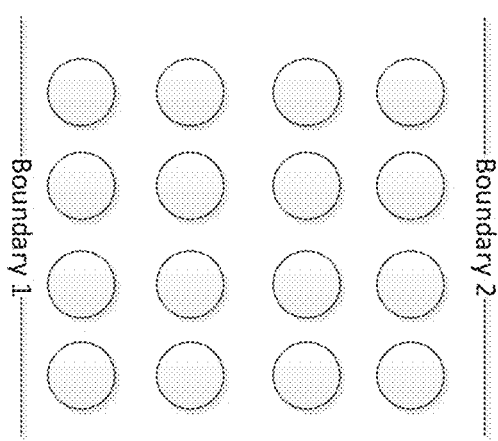
FIG. 9A and FIG. 9B illustrate examples of conditionally applying de-blocking filter to a first boundary or a second boundary according to an embodiment of the present invention.
Figure 9B:
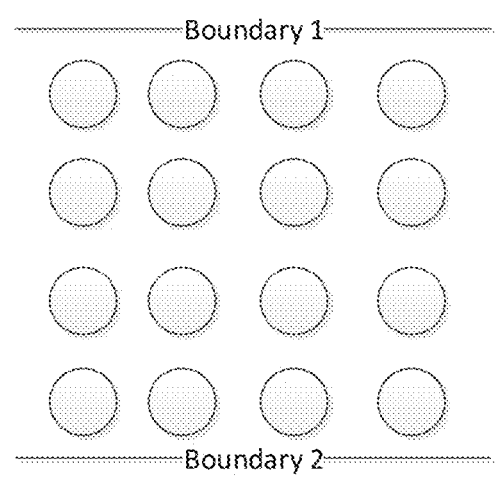

In one embodiment, if the width of current sub-block is equal to M, then the number of boundary samples involved in de-blocking each vertical boundary is M, the number of samples at each side of the boundary is M/2. An example for M=4 is shown in FIG. 9A, and an example of involved samples for M=4 is shown in FIG. 8A. If the height of current sub-block is equal to M, then the number of boundary samples involved in de-blocking each horizontal boundary is M and the number of samples at each side of the boundary is M/2. An example of M=4 is shown in FIG. 9B, and an example of the involved samples for M=4 is shown in FIG. 8B.

In another embodiment, if the width/height of current sub-block is equal to M, then the samples filtered by normal filtering mode at vertical/horizontal boundary are the closest M/4 samples at each side of the boundary and the samples filtered by strong filtering mode at vertical/horizontal boundary are the closest M/2 samples at each side of the boundary. If M is equal to 4, the filtered samples by normal filtering mode are pi0, qi0 as shown in FIG. 8A and FIG. 8B, the samples filtered by strong filtering mode are pi0, pi1, qi0, qi1 as shown in FIG. 8A and FIG. 8B.

In still another embodiment, if the width/height of current sub-block is equal to M, then the samples filtered by normal filtering mode at vertical/horizontal boundary are the closest M/2 samples and the strong filtering mode is disabled. If M is equal to 4, then the samples filtered by normal filtering mode at vertical/horizontal boundary are pi0, pi1, qi0, qi1 as shown in FIG. 8A and FIG. 8B.

In still another embodiment, if the width/height of current sub-block is equal to M, then the samples filtered by normal filtering mode at the vertical/horizontal boundary are the closest M/4 samples and the strong filtering mode is disabled. If M is equal to 4, then the samples filtered by normal filtering mode at the vertical/horizontal boundary are pi0, qi0, as shown in FIG. 8A and FIG. 8B.

In still another embodiment, if the width of current sub-block is equal to M, then de-blocking filter is disabled at the vertical boundary, if the height of current sub-block is equal to M, then de-blocking filter is disabled at the horizontal boundary.

In still another embodiment, when the sub-block width or height is N and is smaller than the de-blocking grid (e. g. M), the normal and strong filters are conditionally applied to one boundary and are skipped for the other boundary. In one example, the filters are applied to the first boundary in FIG. 9A and FIG. 9B. In another example, the filters are applied to the second boundary in FIG. 9A and FIG. 9B. All the operations for the normal and strong filters can be kept the same.

Figure 10A:
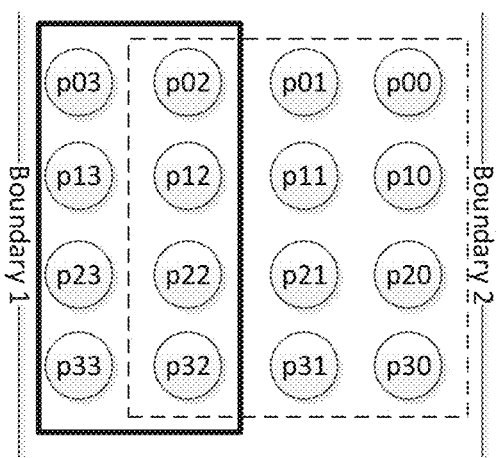
FIG. 10A-FIG. 10F illustrate examples of replacing the reference sample by the sample at the same de-blocking line if the reference sample for performing de-blocking decision or operations at a block boundary are modified by the filtering operations at the other block boundary according to an embodiment of the present invention.
Figure 10B:
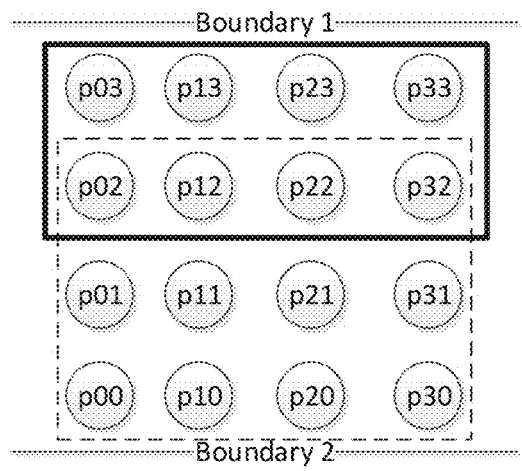
Figure 10C:
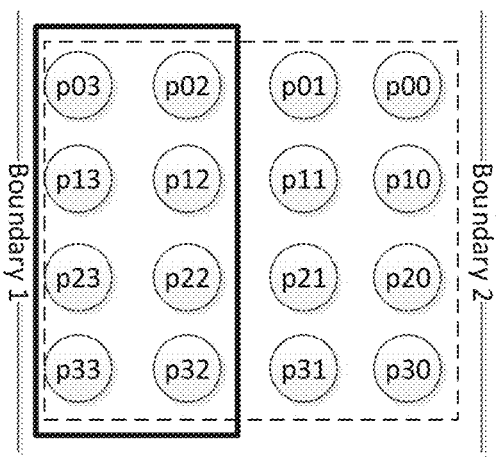
Figure 10D:
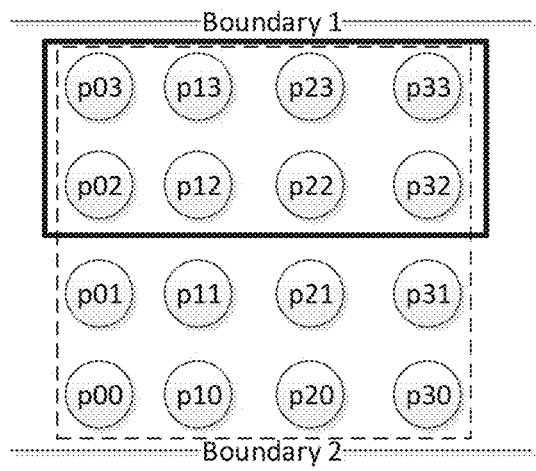
Figure 10E:
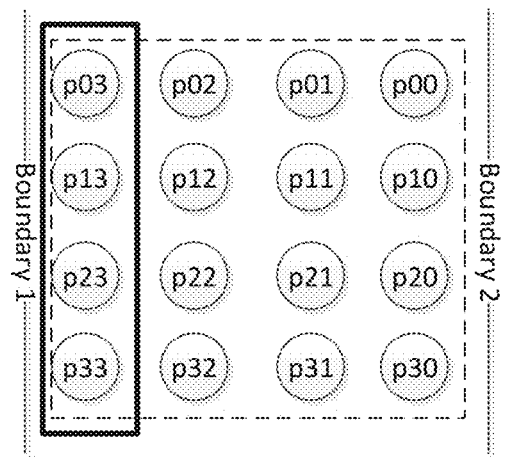
Figure 10F:
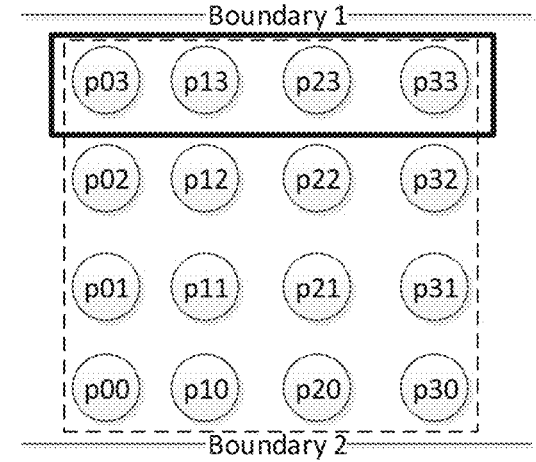

Method 3:

If the reference sample for performing de-blocking decision or operations at a block boundary could be modified by the filtering operations at the other block boundary, then the reference sample is replaced by the sample at the same de-blocking line. Furthermore, the sample at the same de-blocking line has the closest location to the sample that may be modified by the filtering operations at the other block boundary. For example, in FIGS. 10A-F, the samples inside the dash rectangle are used in doing de-blocking decision or operation of Boundary 2, and the samples in the bold solid rectangle might be modified by the filtering operations at Boundary 1. For the cases in FIG. 10A and FIG. 10B, p02, p12, p22, p32 are replaced by p01, p11, p21, p31 in performing de-blocking decision or operation of Boundary 2, respectively. For the cases in FIG. 10C and FIG. 10D, p02 and p03 are replaced by p01; p12 and p13 are replaced by p11; p22 and p23 are replaced by p21; and p32 and p33 are replaced by p31 in doing de-blocking decision or operation of Boundary 2. For the cases in FIG. 10E and FIG. 10F, p03, p13, p23, p33 are replaced by p02, p12, p22, p32 in doing de-blocking decision or operation of Boundary 2, respectively.

Method 4:

When an intra or inter coding mode split a CU into many sub-blocks, and the shape of each sub-block are not all rectangle (e.g., triangle or trapezoid). Then, de-blocking can be applied to all sub-block boundaries, regardless whether the boundary is at hypotenuse. Let the minimum size for de-blocking is M. For every line across the de-blocking boundary, if the size of p-side or q-side is larger than or equal to M, the same de-blocking process as in HEVC is applied to p-side or q-side. Otherwise, as the aforementioned Method 3, the reference sample is replaced by the sample at the same line which has the closest location to the sample that may be modified by the filtering operations at the other block boundary.

Figure 11:
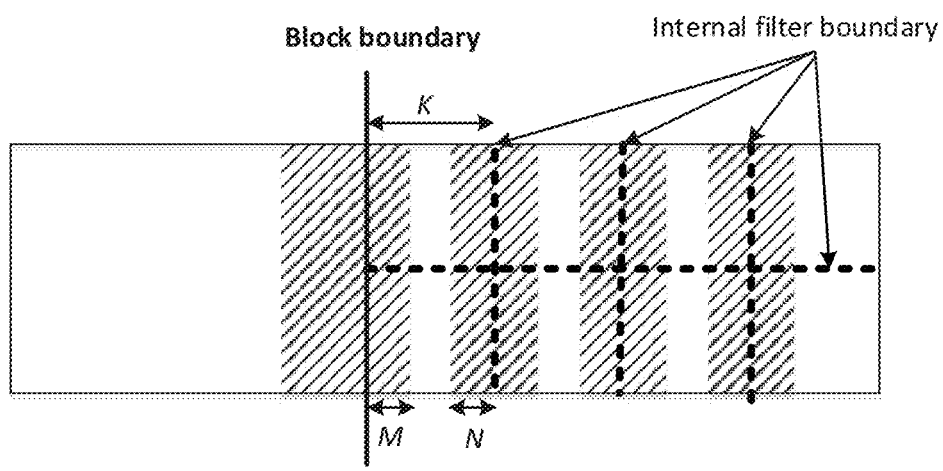
FIG. 11 illustrates an example of only maximum M samples are filtered at the side coded in sub-block mode when at least one side of the current boundary is coded in a sub-block mode according to an embodiment of the present invention.

Method 5:

When an Intra, Inter or transform coding mode (e.g., ATMVP, Affine, Planar MVP mode, SDIP, DMVR, SBT) splits a CU into multiple sub-blocks, de-blocking can be applied to internal partition boundaries, which are aligned with sub-block boundaries or jointly aligned with N×N de-blocking grids (e.g., 8×8 or 4×4). Suppose at least one side of the current boundary is coded in a sub-block mode, then only maximum M samples are filtered at the side coded in sub-block mode. Besides, only maximum N samples at both sides of sub-block boundaries are filtered inside the block coded by the sub-block mode. Then, (M+N) must be smaller than or equal to K (i.e., (M+N)≤K), as illustrated in FIG. 11, where an example for limit the filtering length inside sub-blocks is shown and slash lines are used to mark the modified samples by de-blocking filtering operations.

In one embodiment, K is equal to 8, M is smaller than or equal to 3. N is smaller than or equal to 3. In yet another embodiment, K is equal to 8, M is smaller than or equal to 5. N is smaller than or equal to 2.

Method 6:

When an Intra, Inter or transform coding mode (e.g., ATMVP, Affine, Planar MVP mode, SDIP, DMVR, SBT) splits a CU into multiple sub-blocks, de-blocking can be applied to internal partition boundaries, which are aligned with sub-block boundaries or joint aligned with N×N de-blocking grid (e.g., 8×8 or 4×4). Suppose at least one side of the current boundary is coded in the sub-block mode and the sub-block size is K×K, then only maximum K/2 samples are filtered at the side coded in the sub-block mode.

In another embodiment, K is equal to 8, only maximum 4 samples are filtered at the side coded in the sub-block mode.

Method 7:

If a CU is coded with SDIP mode, each sub-block is regarded as an intra coding block, de-blocking decision then can be applied to internal partition boundaries, which are aligned with sub-block boundaries or joint aligned with N×N de-blocking grid (e.g., 8×8, 4×4). As one embodiment, the filtering strength value at the SDIP sub-block boundary is set to the filtering boundary strength as the case when a boundary block at any side of the current block boundary is Intra coded (e.g., Bs set to 1 or 2). In other words, the filtering strength value at the SDIP sub-block boundary is set to be the same Bs of a boundary at any side of the current block, wherein a boundary block, which has such boundary as its edge and other than the current block, is Intra-coded.

Method 8:

If a CU is coded with SBT mode, de-blocking decision can be applied to internal partition boundaries, which are aligned with sub-block boundaries or joint aligned with N×N de-blocking grid (e.g., 8×8 or 4×4). As one embodiment, the filtering boundary strength value at the SBT sub-block boundary is set to the filtering boundary strength as the case when the cu_cbf at any side of block boundary is non-zero (e.g., Bs is set to 1). In some embodiments, the filtering strength value at the SBT sub-block boundary, cu_cbf of SBT sub-block of which is non-zero, is set to 1 or any other predefined or selected value. As is known in the field, cbf means coded block flag, which is used to indicate whether there is any significant coefficient in the block. When cbf is non-zero, it indicates that a block (i.e., a transform-coded residual block) has at least one significant coefficient.

Method 9:

When an Intra, Inter or transform coding mode (e.g., ATMVP, Affine, Planar MVP mode, SDIP, DMVR, SBT) splits a CU into multiple sub-blocks, de-blocking can be applied to internal partition boundaries, which are aligned with sub-block boundaries or joint aligned with N×N de-blocking grid (e.g., 8×8 or 4×4). In the de-blocking decision process, the filtering strength value should be depend on whether any side of block boundary is coded with CPR (current picture reference) or combined Inter/Intra prediction mode (CIIP). In one embodiment, if any side of sub-block boundary is coded as CPR, then the Bs is set to 0 or 1. In another embodiment, if any side of sub-block boundary is coded as CIIP, then the Bs is set to 1 or 2.

Any of the foregoing proposed methods can be implemented in encoders and/or decoders. For example, any of the proposed methods can be implemented in an Inter/Intra/prediction/transform module of an encoder, and/or an inverse transform/Inter/Intra/prediction module of a decoder. Alternatively, any of the proposed methods can be implemented as a circuit coupled to the inverse transform/Inter/Intra/prediction module of the encoder and/or the Inter/Intra/prediction/transform module of the decoder, so as to provide the information needed by the Inter/Intra/prediction/transform module.

Figure 12:
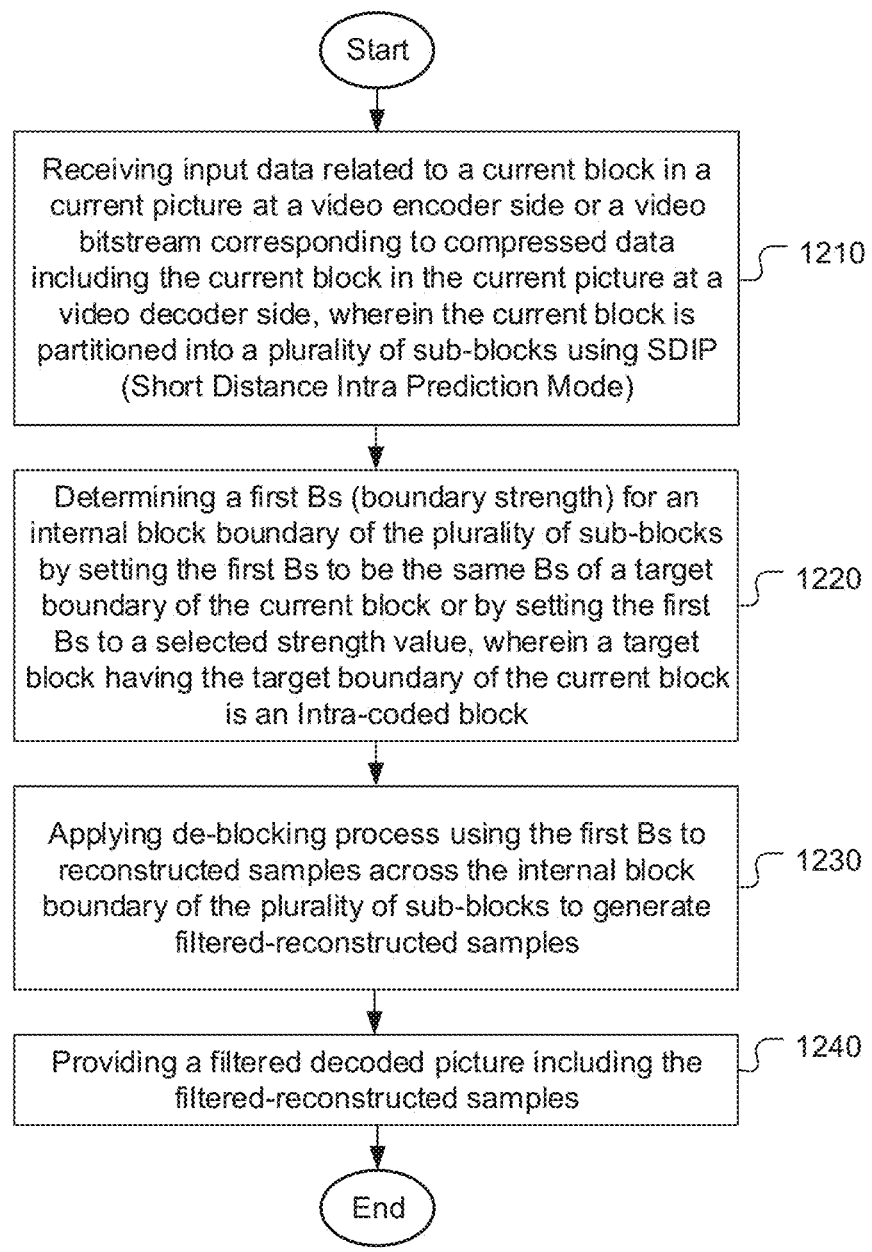
FIG. 12 illustrates a flowchart of an exemplary video coding using constrained de-blocking filter according to an embodiment of the present invention.

FIG. 12 illustrates a flowchart of an exemplary video coding using constrained de-blocking filter according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including the current block in the current picture are received at a video decoder side are received in step 1210, wherein the current block is partitioned into a plurality of sub-blocks using SDIP (Short Distance Intra Prediction mod). A first Bs (boundary strength) is determined for an internal block boundary of the plurality of sub-blocks by setting the first Bs to be a same Bs of a target boundary of the current block or by setting the first Bs to a selected strength value, where a target block having the target boundary of the current block is an Intra-coded block in step 1220. In some embodiments, a boundary at any side of the current block, which is an edge of an Intra-coded block, is taken as the target boundary and such Intra-coded block is taken as the target block. The de-blocking process is applied, using the first Bs, to reconstructed samples across the internal block boundary of the plurality of sub-blocks to generate filtered-reconstructed samples in step 1230. A filtered decoded picture including the filtered-reconstructed samples is provided in step 1240.

Figure 13:
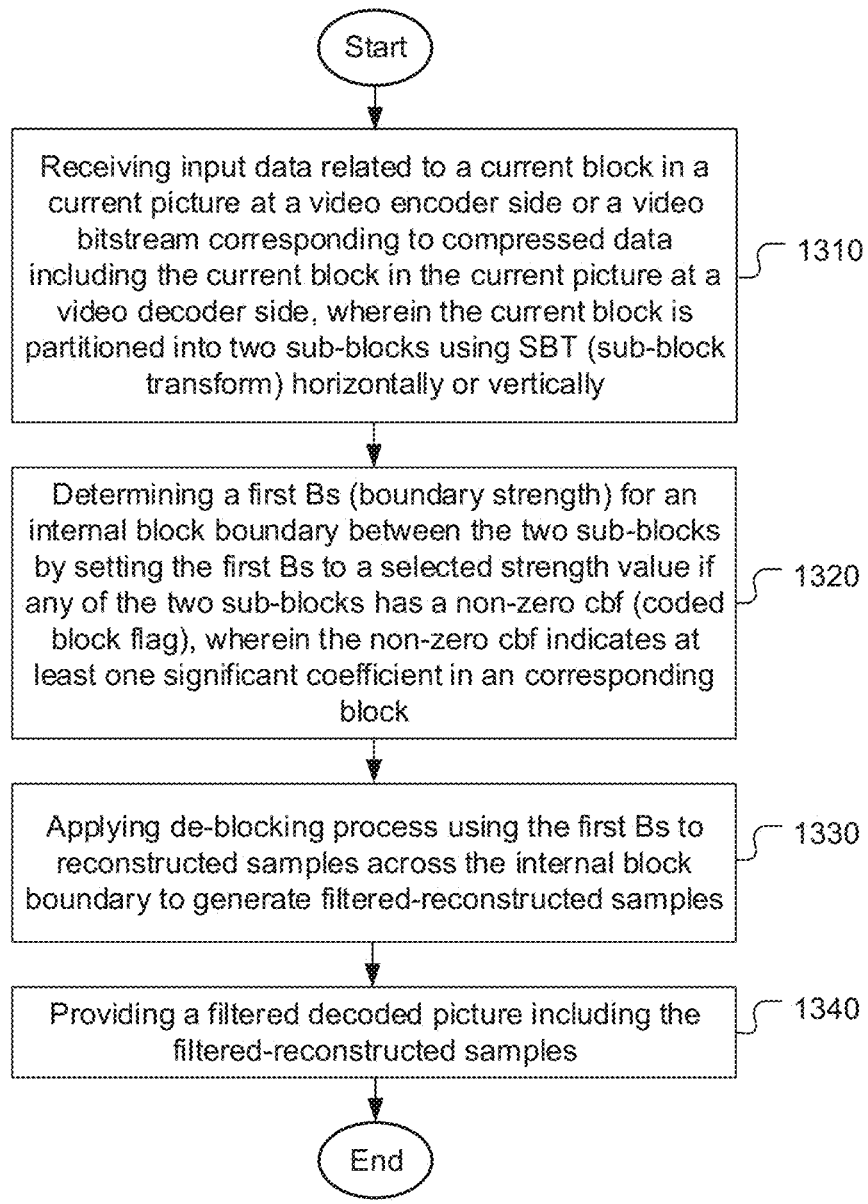
FIG. 13 illustrates a flowchart of another exemplary video coding using constrained de-blocking filter according to an embodiment of the present invention.

FIG. 13 illustrates a flowchart of another exemplary video coding using constrained de-blocking filter according to an embodiment of the present invention. According to this method, input data related to a current block in a current picture are received at a video encoder side or a video bitstream corresponding to compressed data including the current block in the current picture are received at a video decoder side are received in step 1310, wherein the current block is partitioned into two sub-blocks using SBT (sub-block transform) horizontally or vertically. A first Bs (boundary strength) is determined for an internal block boundary between the two sub-blocks by setting the first Bs to a selected strength value if any of the two sub-blocks has a non-zero cbf (coded block flag) in step 1320, wherein the non-zero cbf indicates at least one significant coefficient in an corresponding block. The de-blocking process is applied, using the first Bs, to reconstructed samples across the internal block boundary to generate filtered-reconstructed samples in step 1330. A filtered decoded picture including the filtered-reconstructed samples is provided in step 1340.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of de-blocking of reconstructed picture for video encoding or video decoding, the method comprising:
receiving input data related to a current block in a current picture at a video encoder side or a video bitstream corresponding to compressed data including the current block in the current picture at a video decoder side, wherein the current block is partitioned into a plurality of sub-blocks using SDIP (Short Distance Intra Prediction Mode);
setting a first Bs (boundary strength) for an internal block boundary of the plurality of sub-blocks, including
determining presence or absence of a target boundary shared by the current block and a target block that is an Intra-coded block,
setting the first Bs to a value that is the same as a second Bs of the target boundary in a case that the target boundary is determined as presence, and
setting the first Bs to a selected strength value in a case that the target boundary is determined as absence;
applying de-blocking process using the first Bs to reconstructed samples across the internal block boundary of the plurality of sub-blocks to generate filtered-reconstructed samples; and
providing a filtered decoded picture including the filtered-reconstructed samples.

2. The method of claim 1, wherein the internal block boundary of the plurality of sub-blocks is aligned with an N×N de-blocking grids, wherein N is a positive integer.

3. The method of claim 2, wherein the N is equal to 8 or 4.

4. The method of claim 1, wherein the current block is partitioned into two or four sub-blocks in a horizontal or vertical direction using the SDIP if each partitioned sub-block has at least 16 samples.

5. The method of claim 1, wherein a current sub-block of the plurality of sub-blocks is used to predict a next sub-block of the plurality of sub-blocks.

6. The method of claim 1, wherein the selected strength value corresponds to 1 or 2.

7. An apparatus for video coding, the apparatus comprising one or more electronic circuits or processors arranged to:
receive input data related to a current block in a current picture at a video encoder side or a video bitstream corresponding to compressed data including the current block in the current picture at a video decoder side, wherein the current block is partitioned into a plurality of sub-blocks using SDIP (Short Distance Intra Prediction Mode);
set a first Bs (boundary strength) for an internal block boundary of the plurality of sub-blocks by performing operations including
determination of presence or absence of a target boundary shared by the current block and a target block that is an Intra-coded block,
setting of the first Bs to a value that is the same as a second Bs of the target boundary in a case that the target boundary is determined as presence, and
setting of the first Bs to a selected strength value in a case that the target boundary is determined as absence;
apply de-blocking process using the first Bs to reconstructed samples across the internal block boundary of the plurality of sub-blocks to generate filtered-reconstructed samples; and
provide a filtered decoded picture including the filtered-reconstructed samples.

8. The apparatus of claim 7, wherein the selected strength value corresponds to 1 or 2.

9. The apparatus of claim 7, wherein the internal block boundary is aligned with an N×N de-blocking grids, wherein N is a positive integer.

10. The apparatus of claim 9, wherein the N is equal to 8 or 4.

* * * * *